United States Patent [19]
Takada et al.

[11] Patent Number: 5,657,640
[45] Date of Patent: Aug. 19, 1997

[54] AIR CONDITIONER

[75] Inventors: Hajime Takada, Saitama-ken; Hajime Shimayama; Minoru Katou, both of Gunma-ken, all of Japan

[73] Assignee: Sanyo Electric Co., Ltd., Osaka, Japan

[21] Appl. No.: 528,146

[22] Filed: Sep. 14, 1995

[30]   Foreign Application Priority Data

Sep. 14, 1994 [JP] Japan .................. 6-220544

[51] Int. Cl.$^6$ .................. F25D 17/04; F04F 1/06
[52] U.S. Cl. .................. 62/186; 62/419; 417/326
[58] Field of Search .................. 62/186, 231, 419; 236/49.3; 417/326

[56]   References Cited

FOREIGN PATENT DOCUMENTS

| | | | |
|---|---|---|---|
| 0023657 | 3/1981 | Japan | 62/186 |
| 0038114 | 3/1984 | Japan | 62/186 |
| 890301431 | 7/1991 | Japan | F24F 11/04 |
| 890301432 | 7/1991 | Japan | F24F 11/04 |
| 0160265 | 7/1991 | Japan | 62/186 |
| 5223330 | 8/1993 | Japan | F24F 11/04 |
| 6229612 | 8/1994 | Japan | F24F 11/02 |

OTHER PUBLICATIONS

Kuniomi Oguchi, Hiroyuki Tsukamoto, Hiroshi Seki and Masahiro Agu, 1f Fluctuation Control Of Illuminance Comfortable Luminous Environments, Faculty of Engineering, Ibaraki University (May/1991), pp. 1870–1875.

*Primary Examiner*—William E. Wayner
*Attorney, Agent, or Firm*—Darby & Darby

[57]   ABSTRACT

An air conditioner for exchanging heat from a refrigerant to the outside and adjusting at least one of room temperature and humidity to desired temperature and humidity and having a 1/f fluctuation function for controlling an air supplying means for supplying conditioned air to the room so as to vary the air supplying amount in multiple levels corresponding to a designated reference air amount and irregularly. A reference air amount of the air supplying means can be designated and there is an air amount control for controlling the air supplying means corresponding to the designated reference air amount, and a fluctuation width designates a fluctuation width (volume of the air amount) corresponding to the air amount designated. When the 1/f fluctuation function is employed, the fundamental functions (coolness, warmness, and so forth) of the air conditioner are improved. In addition, the noise of the air conditioner is reduced and the comfort of the user is improved.

8 Claims, 7 Drawing Sheets

AIR CONDITIONER

BACKGROUND OF THE INVENTION

The present invention relates to a air conditioner for exchanging heat from a refrigerant to the outside so as to adjust at least one of room temperature and humidity to desired temperature or humidity and having a function for controlling an air supplying means that supplies conditioned air to the room so as to vary the air supplying amount in multiple levels corresponding to a reference air amount.

A conventional air conditioner exchanges heat from a refrigerant to the outside and operates in various modes such as a heating mode, a cooling mode, a drying mode, and an automatic operating mode. In the automatic operating mode, the air conditioner compares a designated temperature and the room temperature and automatically selects the heating mode or the cooling mode corresponding to the desired result. The user can select a desired mode with a remote controller that is an accessory of the air conditioner so as to air condition the room.

One type of air conditioner has a special cooling function for supplying air while varying the air supplying amount as with natural air. In this function, a predetermined fluctuation width (variation of the change of air flow volume) is designated regardless of the predetermined reference air amount so as to vary the air amount in an irregular manner at different time periods. When the air amount is controlled in such a manner, the user in the room does not expect the air amount change. Thus, since he can unexpectedly feel coolness, the degree of comfort in the room improves.

In other words, although this type of operation takes into account a psychological factor of the user, the coolness comfort that the user feels is improved in comparison with the conventional temperature control method with equal air volume amount. Since the degree of coolness comfort is improved, the designated temperature can be increased as compared to the conventional cooling method. Thus, this type of operation contributes to energy saving.

However, in such a type of operation, the fluctuation of the volume of air supplied does not correspond to the predetermined reference air amount. Thus, the ratio of the fluctuation width to the predetermined reference air amount varies corresponding to a change of the predetermined reference air amount. In other words, when the predetermined reference amount is small (weak), the ratio of the fluctuation width thereto is large. Thus, the user can satisfactorily feel the fluctuation of the air supplying amount. In contrast, when the reference air amount is large (strong), since the ratio of fluctuation width thereto becomes small, the user cannot satisfactorily feel the fluctuation.

To solve this problem, the ratio in the case that the reference air amount is maximum may be designated to have a fluctuation width by an amount such that the user can satisfactorily feel the fluctuation function. However, when the reference air amount is small, the ratio of the fluctuation width thereto becomes too large, resulting in increasing noise due to the increased air volume. Thus, the user may feel uncomfortable.

To satisfactorily employ the fluctuation function, the environment in which the air conditioner is used (the efficiency of the air flow and the reference air amount that is often used depends on the area of the room, the layout of furniture, and so forth) should be considered. Thus, when only the ratio of the fluctuation to the reference air amount is considered, the fluctuation function may not be satisfactorily employed.

SUMMARY OF THE INVENTION

An object of the present invention is to provide an air conditioner for improving the fundamental functions (coolness, warmness, and so forth) thereof, reducing noise in association with the operation thereof, and improving the comfort of the user.

The present invention is an air conditioner having a refrigerating cycle of at least a compressor, a condenser, an expansion device, and an evaporator connected by the necessary refrigerant carrying conduit and adapted for supplying heated or cooled air to an air-conditioned space with an air supplying device, and adjusting the temperature of the air-conditioned space to a predetermined temperature. The air conditioner has a signal output means for outputting a first signal for designating an air supplying amount of the air supplying device, a control means for adjusting the air supplying amount of the air supplying device corresponding to the first signal, and an air supplying amount compensating means for supplying a second signal to the control means. The second signal is adapted for causing the air supplying amount of the air supplying device to be automatically varied in a predetermined range of the air supplying amount designated corresponding to the first signal. There also is a variable width control means for designating the predetermined range corresponding to the first signal supplied from the signal output means.

The variation width control means is adapted for designating the predetermined range corresponding to a predetermined ratio of the predetermined air supplying amount corresponding to the first signal supplied from the signal output means.

The variation width control means is adapted for decreasing the predetermined range corresponding to the increase of the predetermined air supplying amount corresponding to the first signal supplied from the signal output means.

The variable width control means is adapted for increasing the predetermined range when the predetermined air supplying amount corresponding to the first signal supplied from the signal output means is in a predetermined range.

The air supplying amount compensating means is adapted for automatically varying the designated air supplying amount corresponding to the first signal supplied from the signal output means in such a manner that the fluctuation of the air supply volume is varied on the basis of 1/f of the frequency of the power spectrum, i.e., the overall fluctuation of the air supply volume. The 1/f fluctuation controls the air volume in a manner to produce a pleasing air flow volume.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 6(A) to (C) are fluctuation width designating maps stored in a microcomputer according to the embodiment of the present invention.

DETAILED DESCRIPTION OF THE PREFERRED EMBODIMENT

Figure 1:
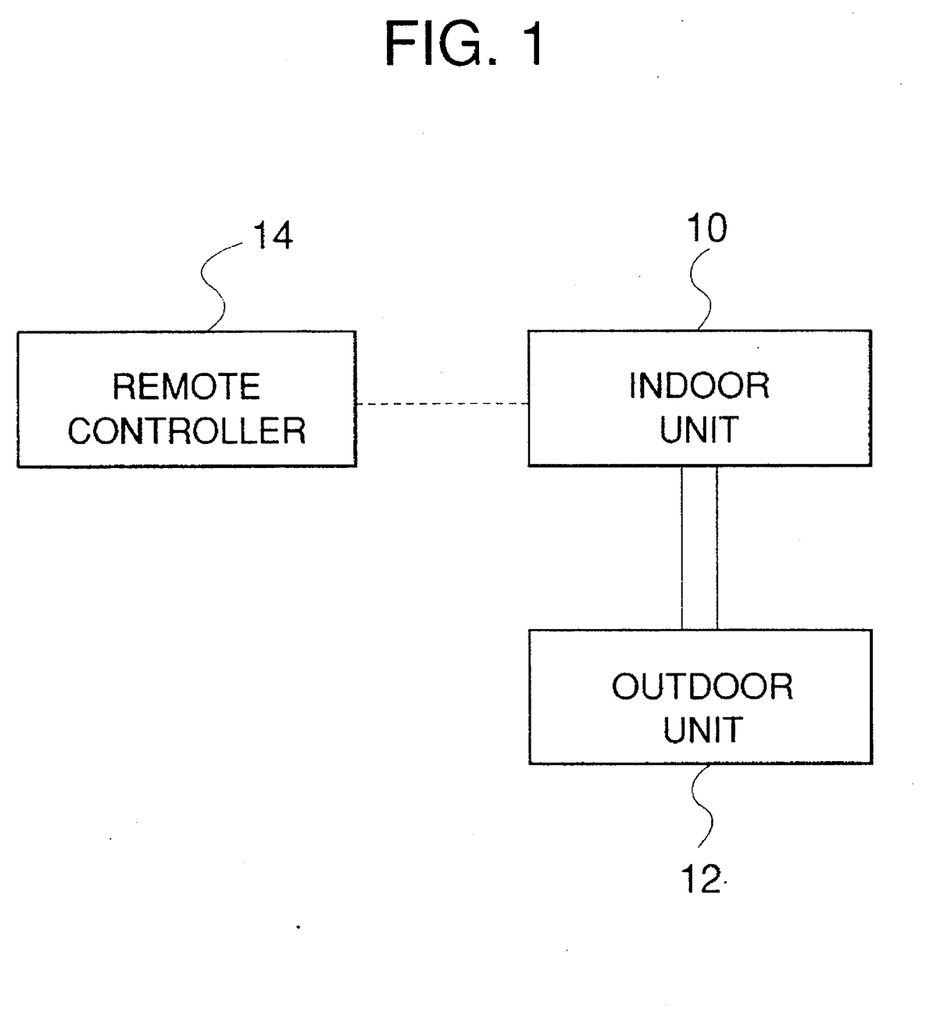
FIG. 1 is a block diagram showing a construction of an air conditioner according to an embodiment of the present invention.

Next, with reference to the accompanying drawings, an embodiment of the present invention will be described. FIG. 1 shows an air conditioner according to the preferred embodiment of the present invention. The air conditioner comprises an indoor unit 10, an outdoor unit 12, and a remote controller 14. The indoor unit 10 and the outdoor unit 12 each have a refrigerant circulating path for circulating a refrigerant. The remote controller 14 sends operation signals, such as by infrared rays, to the air conditioner so as to remotely control it.

The remote controller 14 has various operation keys for turning on/off the power, selecting cooling/heating modes, designating temperature, designating timer, and so forth. With the operation keys, corresponding operation signals are output to the air conditioner. The remote controller 14 has air amount designating keys. With the air amount volume designating keys, the user can select the air amount from "WEAK", "MEDIUM", and "STRONG".

The invention is described as related to an air conditioner that has three fixed levels of air amount. However, the invention can be applied for other constructions in which the air amount is varied in several levels (including, for example, "breeze", "high power", etc.), and is gradually varied rather than in the fixed levels.

In addition, the remote controller 14 according to the embodiment has a "1/f fluctuation" designating key. With the "1/f fluctuation" designating key, the 1/f fluctuation function is executed.

In the 1/f fluctuation function, a predetermined fluctuation width of an supply volume is designated regardless of the predetermined reference air amount. In addition, in the 1/f fluctuation function, the air supply amount is irregularly varied in fluctuation width so that the power spectrum is inversely proportional to the frequency of the variation. Thus, since the air amount is unexpectedly varied, the comfort of the user is improved in comparison with the fixed air amount.

In this embodiment, as a means for sending operation signals of the remote controller 14 to the indoor unit 10, electromagnetic waves such as infrared rays are used. The indoor unit 10 has an optical sensor 76B that receives the infrared rays. The optical sensor 76B will be described later.

When an operation signal sent from the remote controller 14 is received by the optical sensor 76B of the indoor unit 10, the air conditioner controls the room temperature, humidity, and so forth corresponding to the code of the received operation signal. It should be noted that the remote controller 14 can be connected to the indoor unit with a signal line.

Figure 2:
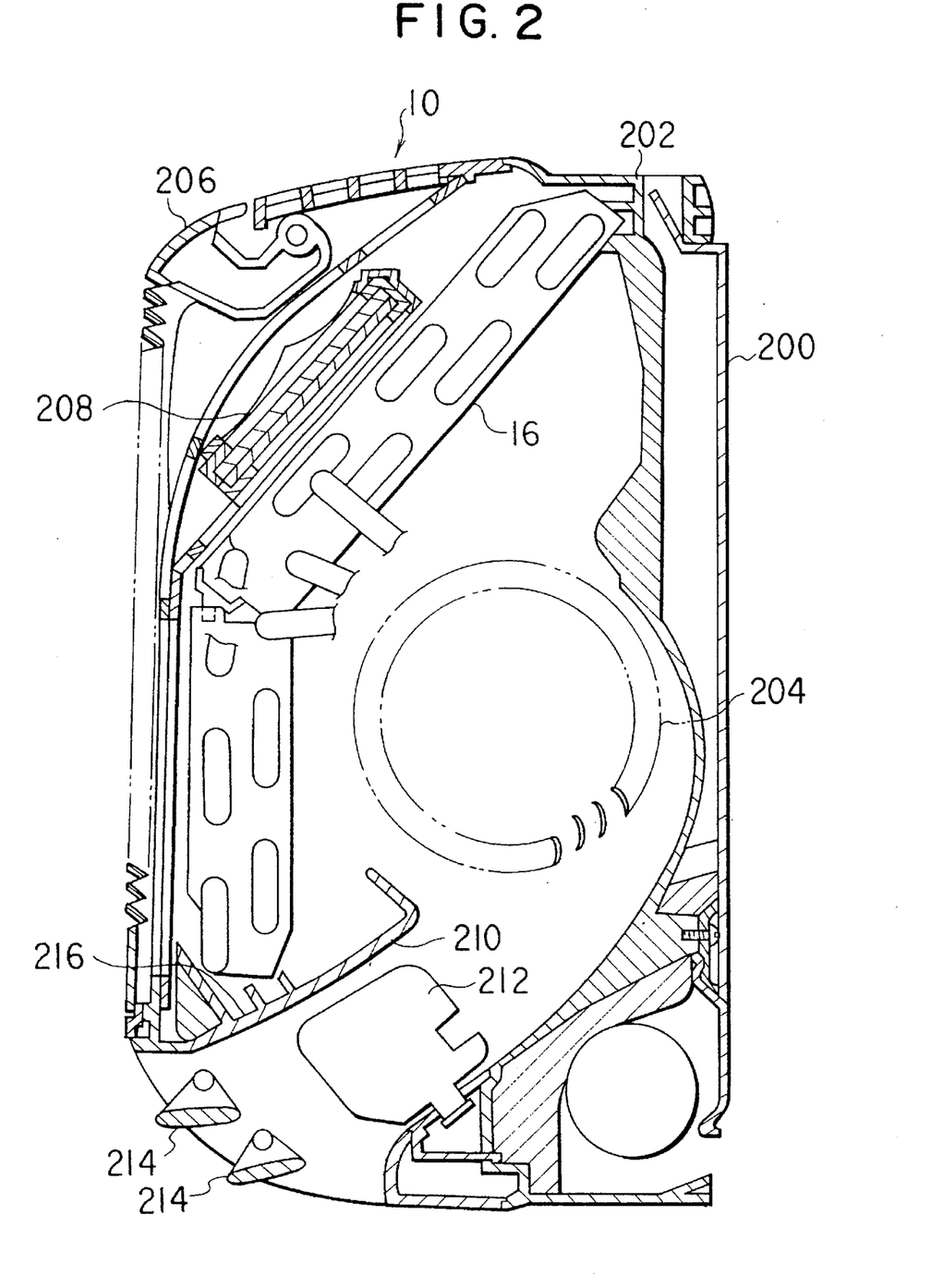
FIG. 2 is a side view showing an internal construction of an indoor unit.

As shown in FIG. 2, the indoor unit 10 is covered by a casing 202. The casing 202 is detachably secured to the upper and lower edges of a mounting base 200. A cross flow fan 204 is disposed at a center portion of the casing 202. The cross flow fan 204 is driven by a fan motor 70E (that will be described later). The cross flow fan 204 sucks air in the room through an inlet opening 206 through various filters 208 and an indoor heat exchanger 16 and supplies the resultant air to the indoor space through an air path 210. The air path 210 has a horizontal fan 212 and horizontal flaps 214 so as to adjust the direction of the air supplied to the room.

A drain pan 216 is integrally disposed at the casing 202 corresponding to the lower portion of the indoor heat exchanger 16.

Figure 3:
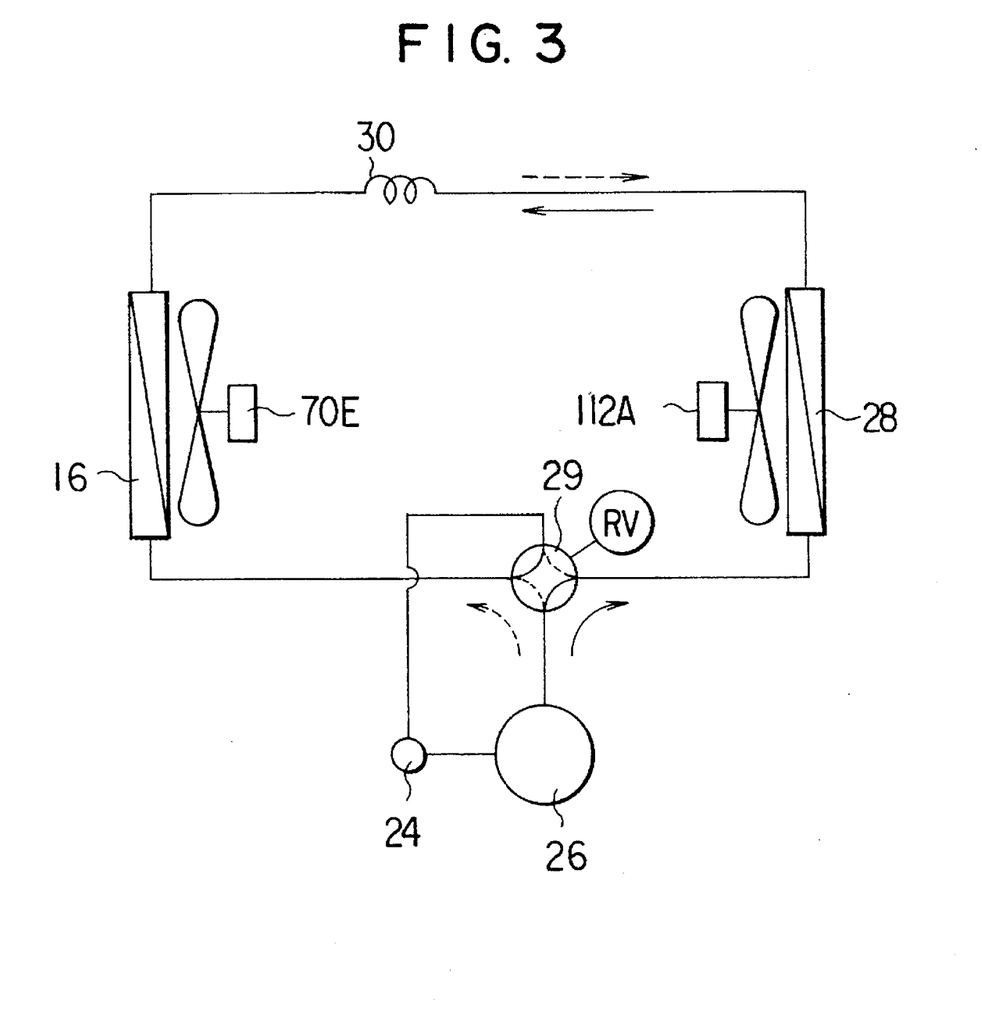
FIG. 3 is a schematic diagram showing a refrigerant circuit of the air conditioner according to the embodiment of the present invention.

FIG. 3 shows a refrigerant circuit of the air conditioner controlled by a control unit according to the present invention. In FIG. 3, reference numeral 26 is a compressor. Reference numeral 29 is a four-way valve. Reference numeral 28 is an outdoor heat exchanger disposed in the outdoor unit 12. Reference numeral 30 is a capillary tube. Reference numeral 16 is an indoor heat exchanger disposed in the indoor unit 10. Reference numeral 24 is an accumulator. These elements are connected by a refrigerant carrying conduct so as to construct a refrigerant cycle.

In the air conditioner, when the four-way valve 29 is placed in the state denoted by a solid line shown in FIG. 3, the refrigerant supplied from the compressor 26 flows in the direction of an arrow denoted by the solid line. Thus, the refrigerant is compressed in the outdoor heat exchanger 28. The refrigerant is evaporated by the indoor heat exchanger 16. Consequently, the room is cooled. On the other hand, when the four-way valve 29 is placed in the state denoted by the dotted line shown in FIG. 3, the refrigerant supplied from the compressor 26 flows in the direction of an arrow denoted by a dotted line. The refrigerant is compressed by the indoor heat exchanger 16. The refrigerant is evaporated by the outdoor heat exchanger 28. Consequently, the room is heated.

Reference numeral 112A is a fan motor that provides an outdoor air supplying device. Reference numeral 70E is a fan motor that provides an indoor air supplying device along with the cross flow fan 204. The fan motor 112A and the fan motor 70E cause air to be supplied to the outdoor heat exchanger 28 and the indoor heat exchanger 16, respectively.

Figure 4:
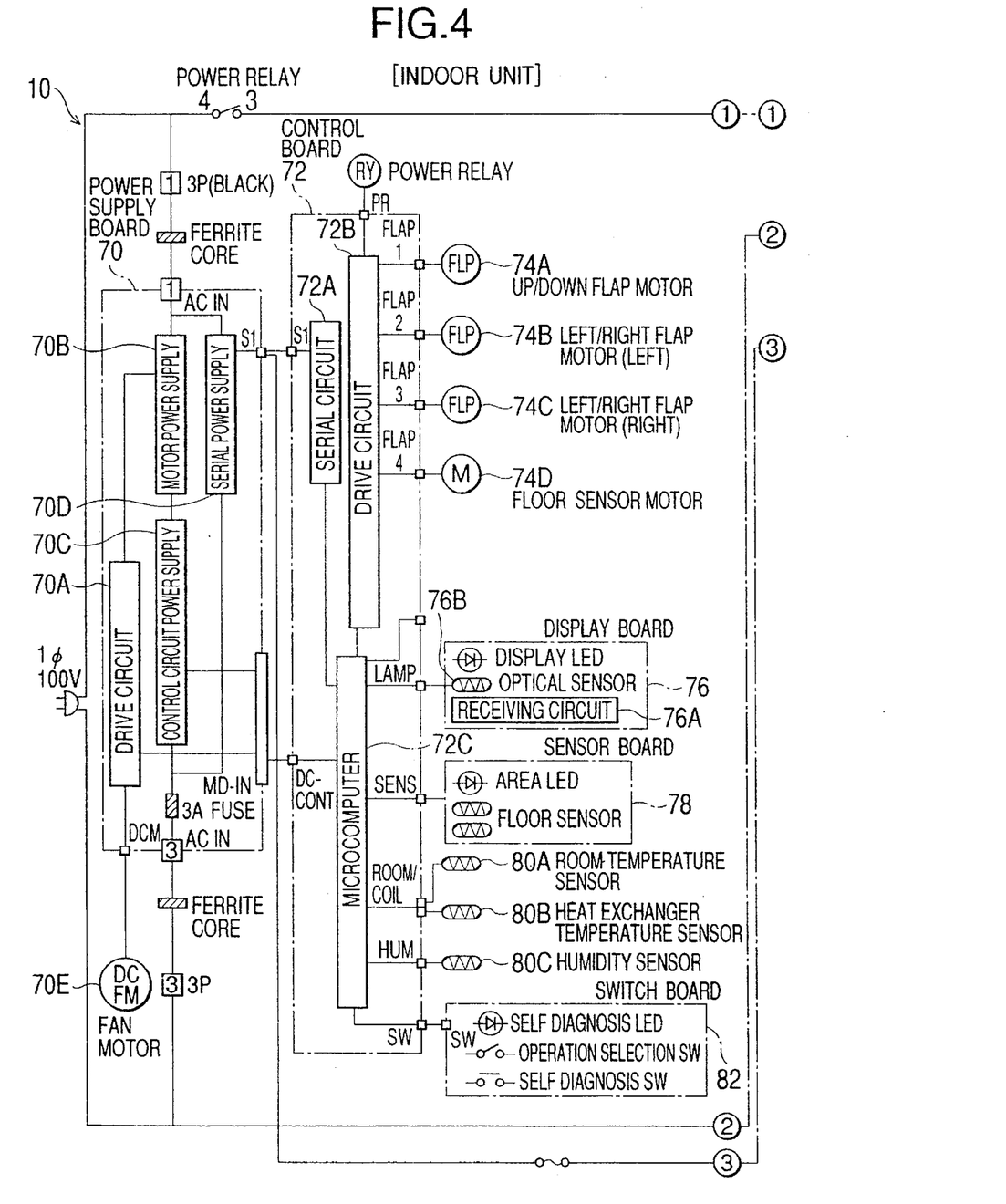
FIG. 4 is an electric circuit diagram of the indoor unit of the air conditioner according to the embodiment of the present invention.

FIG. 4 shows an electric circuit of the indoor unit 10. The electric circuit has a power supply board 70 and a control board 72. The power supply board 70 has a drive circuit 70A, a motor power supply circuit 70B, a control circuit power supply circuit 70C, and a serial circuit power supply circuit 70D. The drive circuit 70A is connected to the fan motor 70E that controls the air amount supplied to the room. The motor power supply circuit 70B generates the power for driving various motors. The control circuit power supply circuit 70C generates power for the control circuit. The serial circuit power supply circuit 70D generates the power for the serial circuit.

The fan motor 70E of the embodiment is a DC motor. The voltage supplied to the fan motor 70E is controlled with an eight bit signal. Thus, by the voltage control, the air amount can be controlled in 256 levels. This voltage control allows the air amount to be finely controlled for the 1/f fluctuation function.

The control board 72 has a serial circuit 72A, a drive circuit 72B, and a microcomputer 72C. The serial circuit 72A is connected to the serial circuit power supply circuit 70D. The drive circuit 72B drives a motor. The microcomputer 72C functions as a control circuit. The drive circuit 72B is connected to an up/down flap motor 74A, left/right flap motors 74B and 74C, and a floor sensor motor 74D. The up/down flap motor 74A vertically moves a flap. The floor sensor motor 74D rotates a floor sensor that detects the temperature of the entire surface of the floor.

The microcomputer 72C is connected to an LED display, an optical sensor 76B, and a receiving circuit 76A. The LED display is disposed on the display board 76 and displays an operation mode and so forth. The receiving circuit 76a receives an operation signal as infrared rays through the optical sensor 76B from the remote controller 14.

In addition, the microcomputer 72C is connected to an area LED and a floor sensor. The area LED is disposed on the sensor plate 78 and displays the temperature detecting area of the floor.

The remote controller 14 causes the air conditioner to drive the flap motors 74A, 74B, and 74C and change the flap-angles and so forth, thereby selecting each of the heating mode, cooling mode, dry mode, and automatic operating mode, changing the designated temperature, and changing the air supplying amount.

In addition, the microcomputer 72C is connected to a room temperature sensor 80A, a heat exchanger temperature sensor 80B, and a humidity sensor 80C. The room temperature sensor 80A detects the room temperature. The heat exchanger temperature sensor 80B detects the temperature of the refrigerant coil of the indoor heat exchanger 16. The humidity sensor 80C detects the humidity of the room. In addition, the microcomputer 72C is connected to a self diagnosis LED, an operation selection switch, and a self diagnosis switch that are disposed on the switch board 82. The operation selection switch selects one of the heating mode, the cooling mode, the dry mode, and the automatic operation mode.

Display LEDs corresponding to the "heating mode", "cooling mode", "dry mode", and "automatic operation mode" are disposed on the display board 76 and light corresponding to the operation modes.

Figure 5:
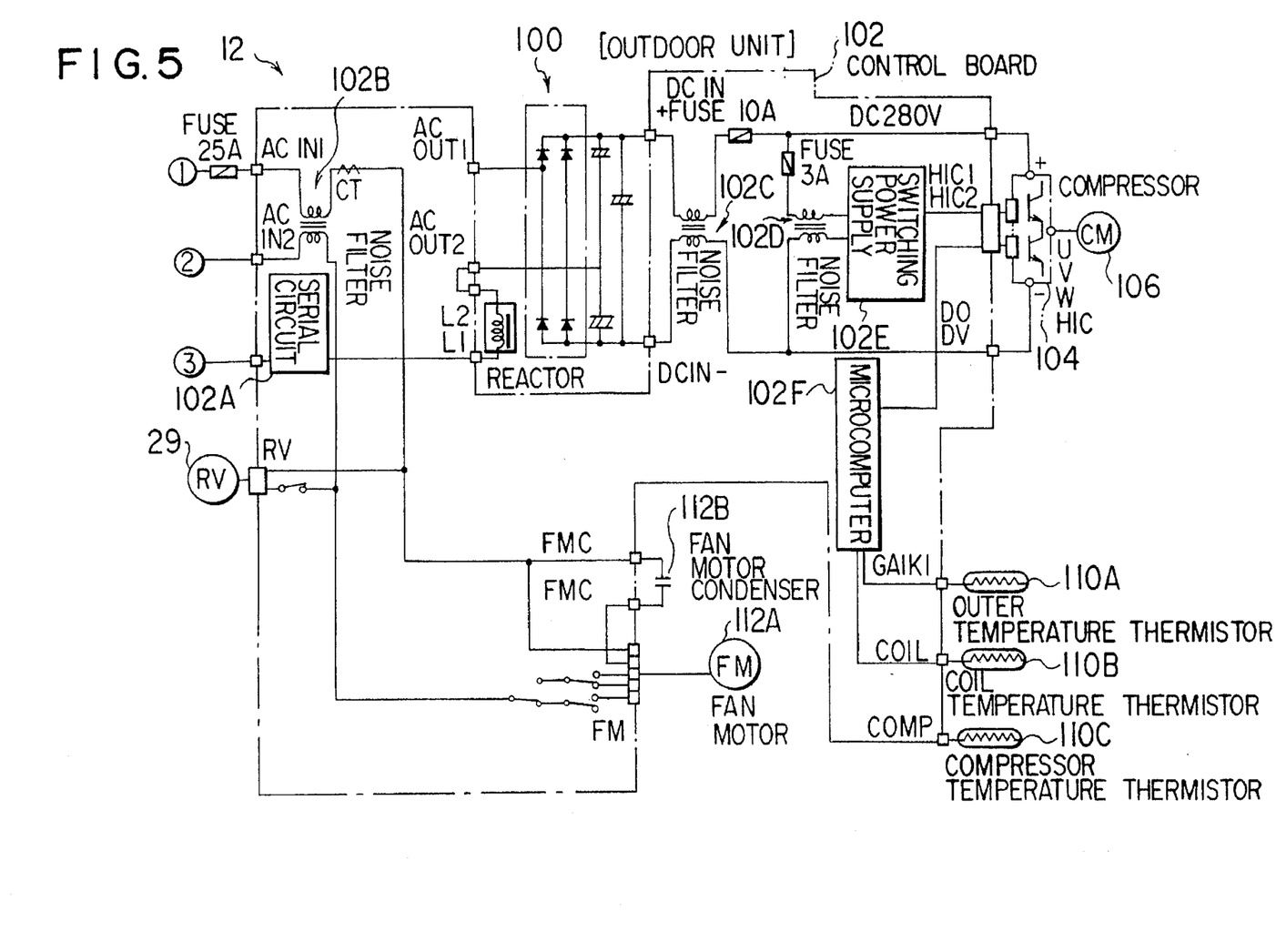
FIG. 5 is an electric circuit diagram of an outdoor unit of the air conditioner according to the embodiment of the present invention.

FIG. 5 shows an electric circuit of the outdoor unit 12. This electric circuit has a rectifier circuit 100 and a control board 102. Terminals (1) to (3) of the electric circuit of the outdoor unit 12 are connected to the electric circuit of the indoor unit 10 shown in FIG. 4.

The control board 102 has a serial circuit 102A, noise filters 102B, 102C, and 120D, a switching power supply circuit 102E, and a microcomputer 102F. The serial circuit 102A is connected to the serial circuit power supply circuit 70D of the indoor unit 10. The noise filters 102B, 102C, and 120D remove noise. The switching power supply circuit 102E generates a power for switching the inverter 104. The microcomputer 102F functions as a control circuit.

The switching power supply circuit 102E is connected to the inverter 104. The inverter 104 is connected to a compressor motor 106 that drives the compressor 26, which compresses the refrigerant.

The microcomputer 102F is connected to an outer air temperature thermistor 110A, a coil temperature thermistor 110B, and a compressor temperature thermistor 110C. The outer air temperature thermistor 110A is an outer temperature sensor that detects the temperature of the outer air. The coil temperature thermistor 110B is a coil temperature sensor that detects the temperature of the refrigerant coil of the outdoor heat exchanger 28. The compressor temperature thermistor 110C is a temperature sensor that detects the temperature of the compressor 26.

The noise filter 102B is connected to a fan motor 112A and a fan motor condenser 112B. The fan motor 112A supplies air to the outdoor heat exchanger 28. In parallel with the fan motor 112A and the fan motor condenser 112B, the four-way valve 27 and a solenoid valve 29 are connected to the noise filter 102B.

In this embodiment, the fluctuation width (change in the volume of air amount from the reference air amount) of the 1/f fluctuation function is varied corresponding to the designated reference air amount.

Figure 6A:
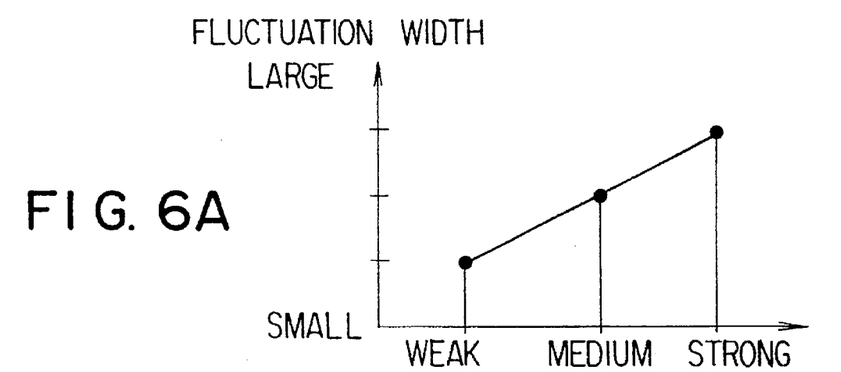
FIG. 6(A) is a map showing an air amount and fluctuation width for emphasizing a 1/f fluctuation function.
Figure 6B:
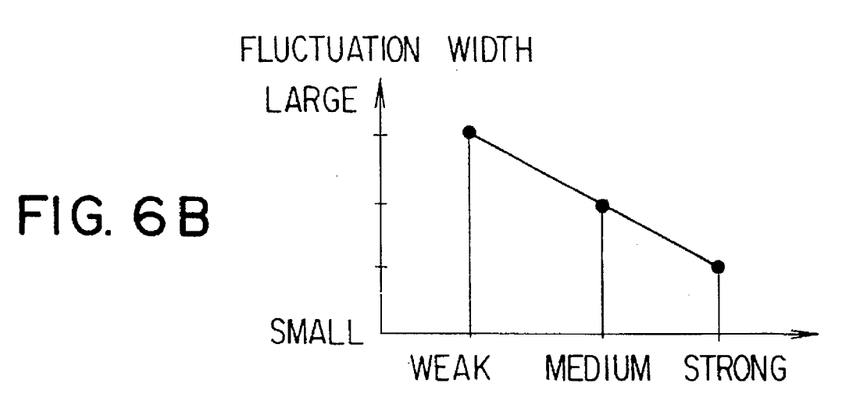
FIG. 6(B) is a map showing air amount and fluctuation width for emphasizing noise reduction.
Figure 6C:
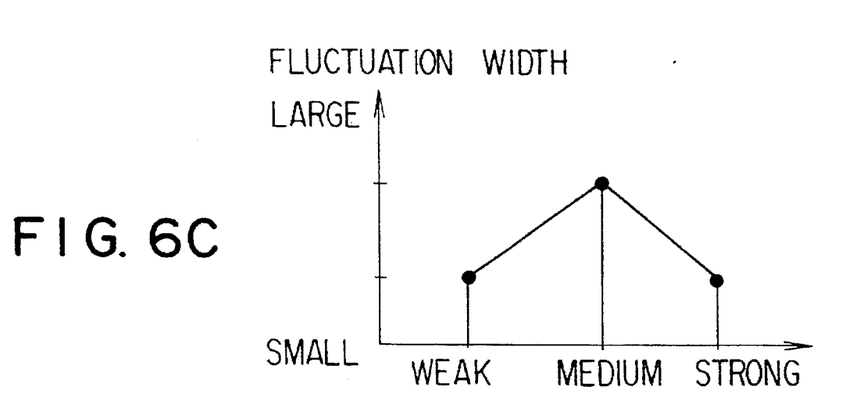
FIG. 6(C) is a map showing air amount and fluctuation width for emphasizing the 1/f fluctuation function in a predetermined air amount state.

In other words, the microcomputer 72C stores fluctuation width (air volume changes) designating maps as a function to the predetermined reference air amount (see FIGS. 6(A) to (C)). One of the fluctuation width designating maps is selected corresponding to the position at which the indoor unit 10 is installed. These maps represent the relation between the reference air amount and fluctuation width corresponding to different installation conditions of the air conditioner.

In this embodiment, three maps have been stored. However, any one or any two of the maps may be selected and stored. In other words, when the installation condition at which the indoor unit 10 is installed is known, the indoor unit 10 can be operated with only one relation between the reference air amount as selected by the user operating the air amount designating key of "WEAK", "MEDIUM" and "STRONG", and fluctuation width.

In the map shown in FIG. 6(A), the fluctuation width increases corresponding to the increase of the air amount. In other words, as seen in FIG. 6(A), when the reference air amount is "weak", the fluctuation width is "small". When the reference air amount is "strong", the fluctuation width becomes large. In the map shown in FIG. 6(A), the fluctuation width is designated so that the ratio of the fluctuation ratio to each reference air amount is constant. Thus, since the varying ratio of the air amount of the 1/f fluctuation function is constant regardless of the air amount, the user in the room can feel the 1/f fluctuation effect regardless of the designated reference air amount.

In the map shown in FIG. 6(B), the fluctuation width decreases corresponding to the increase of the air amount. In other words, when the reference air amount is "weak", the fluctuation width is large. When the air amount is "strong", the fluctuation width becomes small. Since the air amount and the fluctuation width are controlled in such a manner, when the reference air amount is "weak", the noise of the air amount is low. Thus, so as to satisfactorily employ the 1/f fluctuation function, the fluctuation width is increased. When the reference air amount is "strong", the noise of the air amount is large. Thus, so as to suppress the 1/f fluctuation function the fluctuation width is decreased.

In other words, regardless of the air amount, when the noise is kept almost constant (averaged), the discomfort caused by the noise can be reduced. In the map shown in FIG. 6(C), a fluctuation width is designated so that the 1/f fluctuation function can be satisfactorily employed with a predetermined air amount. With other than the predetermined air amount, the fluctuation width is suppressed so as to reduce the noise. In FIG. 6(C), when the reference air amount is "medium", the 1/f fluctuation function is emphasized. When the reference air amount is "weak" or "strong", the noise reduction is emphasized.

In the embodiment of the invention being described, when the indoor unit is installed, one of (1) 1/f fluctuation emphasizing state (FIG. 6(A)), (2) noise reduction emphasizing state (FIG. 6(B)), and (3) combination state (FIG. 6(C)) is selected and designated. After the indoor unit is installed, the fluctuation width is controlled corresponding to the selected map. In this embodiment, the 1/f fluctuation emphasizing state is designated.

Next, the operation of the air conditioner will be described. First, the normal operation of the air conditioner will be described.

When the remote controller 14 is operated in the operation stop state and an operation signal is received by the receiving circuit 76A, the code of the received operation signal is analyzed.

It is determined whether or not the analyzed result is a power on command or a timer designating command. In the power off state, some operation signals, of for example temperature designating command and air amount designating, command are canceled. Thus, when such operation signals are input, they are not accepted and the receiving circuit 7 is kept in the receiving state.

When a timer designating command is detected, the user of the remote controller 14 can designate the timer so that the air conditioner will operate at a predetermined time (for example, two hours later). Thus, the remote controller 14 outputs a corresponding operation signal to the air conditioner and thereby the timer (on time) is designated in the air conditioner. Thus, the air conditioner automatically operates two hours later.

When a power on command is detected, the air conditioner starts in the designated mode of the last operation.

Thereafter, when an operation signal is received from the remote controller 14, the code of the received operation signal is analyzed and it is determined whether or not the analyzed result is a power off command, an air amount designating (changing) command, a temperature designating (changing) command, or a timer designating (changing) command. Corresponding to the determined result, an item corresponding to the analyzed result is selected. Thus, the operation of the air conditioner is stopped or the designated operation mode is executed.

When the 1/f fluctuation function is commanded, the fan motor 70E is controlled. The air amount is varied with the fluctuation width corresponding to the designated air amount. Next, with reference to the flow chart of FIG. 7, the air amount control of the 1/f fluctuation function will be described.

Figure 7:
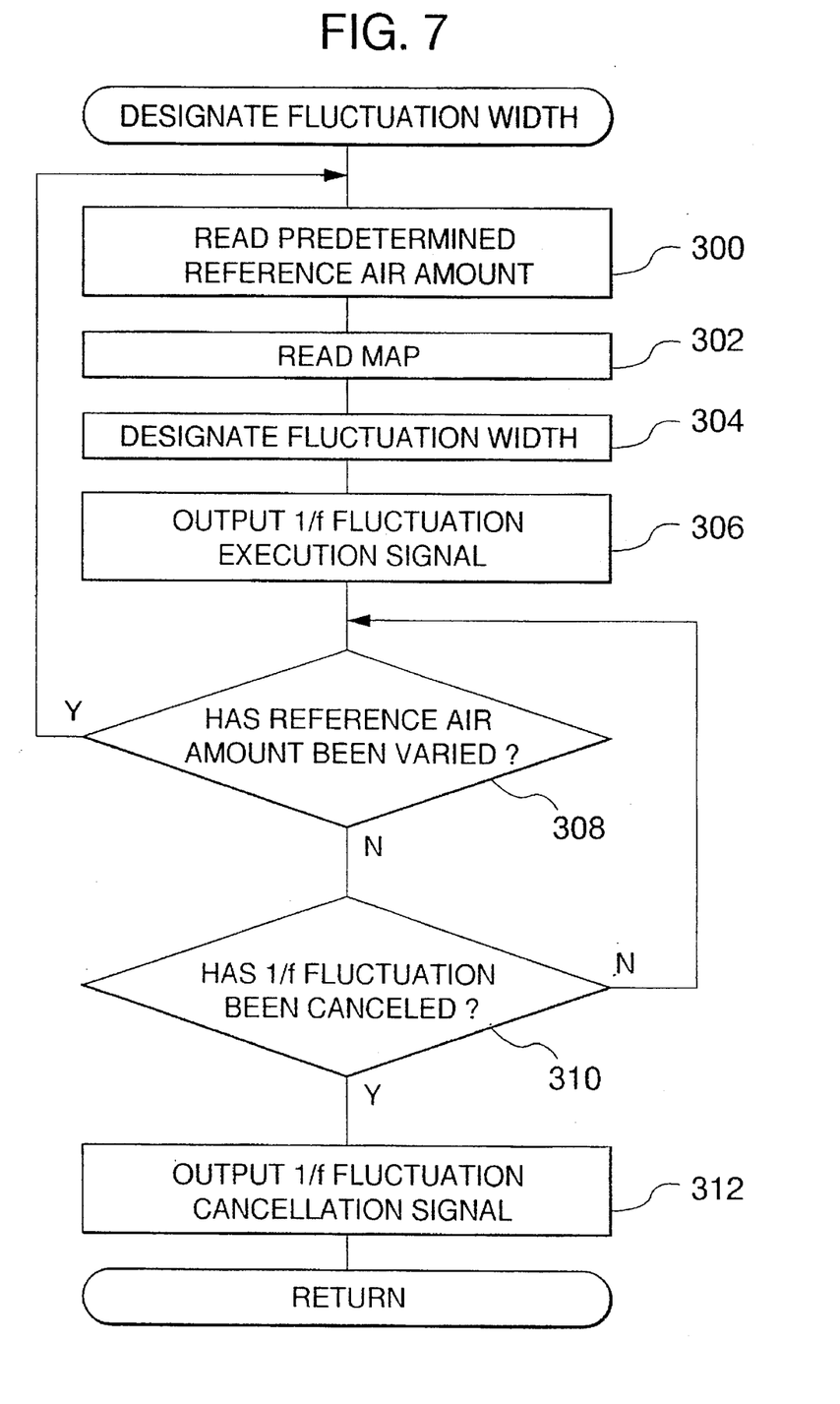
FIG. 7 is a flow chart for controlling the designation of a fluctuation width for the 1/f fluctuation function.

At step 300, the reference air amount that has been designated is read. In other words, one of "weak", "medium", and "strong" reference air amounts is selected.

At step 302, one of the maps shown in FIGS. 6(A) to (C) is read. The map that is read is predesignated corresponding to the condition in which the air conditioner is installed. In the embodiment being described, the map shown in FIG. 6(A) is selected. At step 304, the fluctuation width for the 1/f fluctuation function is obtained corresponding to the map. In other words, when the reference air amount is "weak", the fluctuation width is "small". When the reference air amount is "strong", the fluctuation width becomes "large".

At step 306, a command signal that causes the 1/f fluctuation function to be executed corresponding to the map is output. Thereafter, the flow advances to step 308.

At step 308, it is determined whether or not the reference air amount has been changed. When the determined result is YES, the flow returns to step 300 so as to repeat the above-described process. When the determined result is NO, the flow advances to step 310. At step 310, it is determined whether or not the 1/f fluctuation function has been canceled. When the determined result is YES, the flow advances to step 312. At step 312, a signal for causing the 1/f fluctuation function to be canceled is output. Thus, this routine is finished.

When the 1/f fluctuation function is executed corresponding to the map shown in FIG. 6(A), since the ratio of the fluctuation width to each air amount is almost constant, the user can feel almost the same fluctuation effect regardless of the reference air amount selected.

In the embodiment being described, the map shown in FIG. 6(A) is selected. However, in the case that the map shown in FIG. 6(B) is selected upon installation of the air conditioner, when the reference air amount is "weak", the fluctuation width becomes "large". When the reference air amount is "strong", the fluctuation width becomes "low".

When such a control is performed, the noise can be equalized regardless of the reference air amount. Thus, the noise can be more reduced than the case of which the fluctuation width is constant.

In the case that the map shown in FIG. 6(C) is selected, when the reference air amount is "medium", the fluctuation width is large. Thus, the effect of the 1/f fluctuation function can be maximally obtained. At this point, although the noise increases to some extent, when another reference air amount is selected, since the fluctuation width is maximally suppressed, the effect of the 1/f fluctuation function cannot be satisfactorily obtained. However, in this case, the noise can be reduced. In this embodiment, the reference air amount that is often used is "medium". However, another reference air amount can be selected.

According to this embodiment, since the fluctuation width is varied corresponding to the reference air amount, effects that have not accomplished (for example, the emphasis of the 1/f fluctuation function, the emphasis of the noise, or the opposite of the improvement of 1/f fluctuation function and the noise reduction) can be accomplished.

For example, when a relatively small room of a quiet residence is being air-conditioned, the noise reduction aspect can be emphasized (with the map shown in FIG. 6(B)). When a room of a store or the like that does not relatively require a quiet environment is being air-conditioned, the 1/f fluctuation function can be improved so as to save energy (with the map shown in FIG. 6 (A)).

Now consider the case that a large room is normally air-conditioned with a strong constant air amount and a small partitioned area of the room is air-conditioned with a weak air amount. In this case, with the map shown in FIG. 6(C), when the large room is air-conditioned, the 1/f fluctuation function can be emphasized. When the small area is air-conditioned, the noise reduction can be emphasized.

In the described embodiment, the three types of fluctuation width designating maps have been stored in the microcomputer 72C. When the air conditioner is installed, one of the maps is selected. However, it should be noted that more than three types of maps may be stored and used. In addition, after the air conditioner is installed, the user can select one of the maps. Instead, only one of the maps may be stored.

As described above, according to the air conditioner of the present invention, a fluctuation width to each reference air amount is designated so that the ratio of the fluctuation width thereto becomes constant. Thus, the user can feel the comfort of the 1/f fluctuation regardless of any reference air amount.

When the fluctuation width is decreased corresponding to the increase of the predetermined reference air amount, the noise of the air supplying means can be kept constant regardless of the predetermined reference air amount. Thus, the discomfort of the noise can be removed.

When the 1/f fluctuation function is satisfactorily employed with to a reference air amount that is often used and otherwise the 1/f fluctuation function is suppressed for noise reduction, both the effects of antinomy can be accomplished.

In other words, when the 1/f fluctuation function is employed, the fundamental functions (coolness, warmness, and so forth) of the air conditioner are improved. In addition, the noise of the air conditioner is reduced. Thus, the comfort of the user can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An air conditioner having a refrigerating cycle of at least a compressor, a condenser, an expansion device, and an evaporator connected by a refrigerant carrying conduit and adapted for supplying heated or cooled air to an air-conditioned space with an air supplying device, and adjusting the temperature of the air-conditioned space to a desired temperature, comprising:

signal output means for outputting a first signal for designating an air supplying amount of the air supplying device;

control means for adjusting the air supplying amount of the air supplying device corresponding to the first signal;

air supplying amount compensating means for supplying a second signal to said control means, the second signal being adapted for causing the air supplying amount of the air supplying device to be automatically varied in a predetermined range of the air supplying amount designated corresponding to the first signal; and variable width control means for designating the predetermined range corresponding to the first signal supplied from said signal output means.

2. The air conditioner as set forth in claim 1, wherein said variable width control means is adapted for designating the predetermined range in accordance with a predetermined ratio of the predetermined air supply amount corresponding to the first signal supplied from said signal output means.

3. The air conditioner as set forth in claim 2, wherein said air supplying amount compensating means automatically varies the designated air supplying amount corresponding to the first signal supplied from said signal output means by an amount corresponding to the frequency 1/f of the frequency of fluctuations of the power spectrum of the air supplying amount.

4. The air conditioner as set forth in claim 1, wherein said variable width control means is adapted for decreasing the predetermined range corresponding to an increase in the predetermined air supply amount corresponding to the first signal supplied from said signal output means.

5. The air conditioner as set forth in claim 4, wherein said air supplying amount compensating means automatically varies the designated air supplying amount corresponding to the first signal supplied from said signal output means by an amount corresponding to the frequency 1/f of the frequency of fluctuations of the power spectrum of the air supplying amount.

6. The air conditioner as set forth in claim 1, wherein said variable width control means is adapted for increasing the predetermined range when the predetermined air supply amount corresponding to the first signal supplied from said signal output means is in a predetermined range.

7. The air conditioner as set forth in claim 6, wherein said air supplying amount compensating means automatically varies the designated air supplying amount corresponding to the first signal supplied from said signal output means by an amount corresponding to the frequency 1/f of the frequency of fluctuations of the power spectrum the air supplying amount.

8. The air conditioner as set forth in claim 1, wherein said air supplying amount compensating means automatically varies the designated air supplying amount corresponding to the first signal supplied from said signal output means by an amount corresponding to the frequency 1/f of the frequency of fluctuations of the power spectrum of the air supplying amount.

* * * * *